United States Patent
Lei (10) Patent No.: US 11,453,412 B2
(45) Date of Patent: Sep. 27, 2022

(54) METHOD AND DEVICE FOR PUSHING CONTENT

(71) Applicant: Bayerische Motoren Werke Aktiengesellschaft, Munich (DE)

(72) Inventor: Wenhui Lei, Shanghai (CN)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 380 days.

(21) Appl. No.: 16/687,909

(22) Filed: Nov. 19, 2019

(65) Prior Publication Data
US 2020/0079399 A1 Mar. 12, 2020

Related U.S. Application Data

(63) Continuation of application No. PCT/CN2017/089203, filed on Jun. 20, 2017.

(51) Int. Cl.
*B60W 50/14* (2020.01)
*B60W 50/10* (2012.01)
*G06N 5/02* (2006.01)

(52) U.S. Cl.
CPC ............ *B60W 50/14* (2013.01); *B60W 50/10* (2013.01); *G06N 5/022* (2013.01)

(58) Field of Classification Search
None
See application file for complete search history.

(56) References Cited

U.S. PATENT DOCUMENTS

| 6,351,698 B1* | 2/2002 | Kubota ............ G01C 21/3608 |
| | | 704/E15.045 |
| 9,589,392 B2 | 3/2017 | Waeller et al. |
| 2014/0095000 A1 | 4/2014 | Waeller et al. |
| 2014/0136013 A1 | 5/2014 | Wolverton et al. |
| 2014/0136187 A1 | 5/2014 | Wolverton et al. |
| 2017/0120930 A1* | 5/2017 | Ling ..................... B60W 50/10 |

FOREIGN PATENT DOCUMENTS

| CN | 103209220 A | 7/2013 |
| CN | 103577558 A | 2/2014 |
| CN | 103635346 A | 3/2014 |
| CN | 104933883 A | 9/2015 |
| CN | 105335447 A | 2/2016 |

(Continued)

OTHER PUBLICATIONS

Extended European Search Report issued in European Application No. 17914546.1 dated Jan. 21, 2021 (eight (8) pages).

(Continued)

*Primary Examiner* — Abdhesh K Jha
(74) *Attorney, Agent, or Firm* — Crowell & Moring LLP (57) ABSTRACT

A method and device for pushing content acquires at least one of information related to a vehicle and information related to a driver of the vehicle; determines information characterizing the potential demand of the driver on the knowledge related to a vehicle based on the acquired information; selecting content to be pushed to the driver based on the information characterizing the potential demand of the driver on the knowledge related to a vehicle, wherein the content comprises the knowledge related to a vehicle; and pushes the selected content to a mobile terminal of the driver.

15 Claims, 8 Drawing Sheets

(56) References Cited

FOREIGN PATENT DOCUMENTS

| CN | 105976451 A | 9/2016 |
| CN | 106023345 A | 10/2016 |
| CN | 106448221 A | 2/2017 |
| CN | 106681441 A | 5/2017 |
| CN | 106682795 A | 5/2017 |

OTHER PUBLICATIONS

Chinese-language Office Action issued in Chinese Application No. 201780091021.0 dated Mar. 1, 2021 with English translation (18 pages).
Chinese-language Office Action issued in Chinese Application No. 201780091021.0 dated Oct. 11, 2021 with English translation (18 pages).
International Search Report (PCT/ISA/210) issued in PCT Application No. PCT/CN2017/089203 dated Feb. 24, 2018 (three pages).
Written Opinion (PCT/ISA/237) issued in PCT Application No. PCT/CN2017/089203 dated Feb. 24, 2018 (three pages).

\* cited by examiner

Fig. 1

Method 200

Fig. 2

Method 300

METHOD AND DEVICE FOR PUSHING CONTENT

CROSS REFERENCE TO RELATED APPLICATION

This application is a continuation of PCT International Application No. PCT/CN2017/089203, filed Jun. 20, 2017, the entire disclosure of which is herein expressly incorporated by reference.

BACKGROUND AND SUMMARY OF THE INVENTION

The present disclosure relates to content pushing, and specifically, to a method and device for pushing content related to a vehicle.

More and more people own vehicles, but many drivers are not familiar with the functions and usage of the vehicles having relatively complex structures and functions themselves. Some vehicle operators may provide electronic guidelines, but the drivers often do not have time or interest to read and learn.

Under such circumstances, once the drivers encounter problems, even simple problems sometimes, they may call the call centers of the vehicle operators to solve the problems, so that the burdens of the call centers are heavy.

The present disclosure provides a method and device for pushing content, which can specifically push content to a mobile terminal of a driver of a vehicle to assist the driver in better learning knowledge related to a vehicle, thereby relieving the burden of a call center.

According to some embodiments, provided is a method, including the steps of: acquiring at least one of information related to a vehicle and information related to a driver of the vehicle; determining information characterizing the potential demand of the driver on the knowledge related to a vehicle based on the acquired information; selecting content to be pushed to the driver based on the information characterizing the potential demand of the driver on the knowledge related to a vehicle, wherein the content includes the knowledge related to a vehicle; and pushing the selected content to a mobile terminal of the driver.

According to some embodiments, the step of determining information characterizing the potential demand of the driver on the knowledge related to a vehicle based on the acquired information may include at least one of the following: (1) deducing a possible fault of the vehicle based on the acquired information, thus determining information characterizing the potential demand of the driver on the knowledge about preventing or solving the fault; and (2) deducing, based on the acquired information, the knowledge related to a vehicle that is most concerned by the driver, thus determining information characterizing the potential demand of the driver for learning the most concerned knowledge related to a vehicle.

According to some embodiments, the information related to a vehicle may include information related to the condition of the vehicle and information related to the environment of the vehicle.

According to some embodiments, the information related to the condition of the vehicle may include at least one of the following: vehicle model, vehicle configuration, total mileage, total oil consumption, average oil consumption, service time, part wear condition and repair record.

According to some embodiments, the information related to the environment of the vehicle may include at least one of the following: position of the vehicle, navigated position of the vehicle, forecasted weather condition of the position of the vehicle and/or the navigated position of the vehicle, and geographic feature of the position of the vehicle and/or the navigated position of the vehicle.

According to some embodiments, the information related to a driver of the vehicle may include at least one of the following: usage frequency and intensity of a brake, usage frequency and intensity of an accelerator, violation record, driving speed, driving acceleration, average driving time, driving experience and steering wheel turning data.

According to some embodiments, the content may include at least one of the following: text, picture, audio, video and link.

According to some embodiments, the pushing may be based on an event or based on timing.

According to some embodiments, the method may further include the steps of: receiving a question related to the vehicle from the driver; and determining information characterizing the potential demand of the driver on the knowledge related to a vehicle based on the received question related to the vehicle besides the acquired information, wherein the knowledge related to a vehicle includes an answer to the question.

According to some embodiments, the information related to the driver of the vehicle includes information related to a historical question and answer record of the driver, and the method may further include the steps of: receiving a question related to the vehicle from the driver; and determining information characterizing the potential demand of the driver on the knowledge related to a vehicle based on the information related to the historical question and answer record of the driver in the acquired information related to the driver of the vehicle, wherein the knowledge related to a vehicle includes an answer to the question.

According to some embodiments, the information related to the driver of the vehicle includes information related to a historical question and answer record of the driver, and the method may further include the steps of: receiving a question related to the vehicle from the driver; and selecting content to be pushed to the driver based on the information related to the historical question and answer record of the driver in the acquired information related to the driver of the vehicle, wherein the content includes knowledge related to a vehicle, and the knowledge related to a vehicle includes an answer to the question.

According to some embodiments, the step of selecting content to be pushed to the driver based on the information characterizing the potential demand of the driver on the knowledge related to a vehicle may further include: selecting content to be pushed to the driver from a vehicle learning knowledge base, wherein the vehicle learning knowledge base is constructed by the following operation: collecting user interaction data related to the vehicle from a public media source and a call center; analyzing and integrating the user interaction data to determine information related to the vehicle and/or related to the driver of the vehicle that is involved with the user interaction data, thus determining the information characterizing the potential demand of the driver on the knowledge related to a vehicle, and determining a question related to the vehicle and an answer to the question as the knowledge related to a vehicle; and constructing the vehicle learning knowledge base based on the determination, wherein the vehicle learning knowledge base stores the information characterizing the potential demand of the driver on the knowledge related to a vehicle in connection with the knowledge related to a vehicle.

According to some embodiments, the vehicle learning knowledge base may be further constructed by the following operation: determining and storing the raising number of a question related to the vehicle and/or the affirmation number of an answer to the question, wherein different questions related to the vehicle are endowed with different weights or ranks according to the raising number, and different answers to the questions are endowed with different weights or ranks according to the affirmation number. The method may further include the step of: selecting content to be pushed to the driver based on the weight or rank of the question related to the vehicle and/or the weight or rank of the answer to the question.

According to some embodiments, the method may further include the steps of: re-collecting user interaction data from the public media source and the call center; determining the change of the re-collected user interaction data relative to the previous user interaction data; and updating the information characterizing the potential demand of the driver on the knowledge related to a vehicle and the knowledge related to a vehicle based on the change.

According to some embodiments, the method may further include the step of: receiving a feedback provided by the driver via the mobile terminal of the driver for the pushed content.

According to some embodiments, provided is a device, including: a memory, used for storing computer readable instructions; and one or more processors, configured to run the computer readable instructions to execute the operations of the above method.

According to some embodiments, provided is a non-transient computer readable storage medium, which stores computer readable instructions, wherein when the instructions are executed by one or more processors, the processors execute the operations of the above method.

According to some embodiments, provided is a device, including components for executing the operations of the above method.

The content pushing method and device of the present disclosure can actively push the specific content related to the vehicle according to the characteristics of the vehicle itself and/or the characteristics of the driver of the vehicle, thereby assisting the driver in better learning the knowledge related to a vehicle. The content pushing method and device of the present disclosure can also forecast the possible fault of the vehicle, and push the relevant content, so that the driver learns the knowledge about how to prevent and/or deal with the fault in advance. Aiming at the question raised by the driver, the content pushing method and device of the present disclosure can further give a more accurate answer based on the information related to the vehicle and/or the information related to the driver of the vehicle. The content pushing method and device of the present disclosure can further push the content which may be most concerned by the driver according to the characteristics of the driver. The content pushing method and device of the present disclosure can further provide many other advantages not limited to the above ones, e.g., can greatly reduce the number of calls to the call center, reduce traffic accidents, improve the driving skill of the driver, etc.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
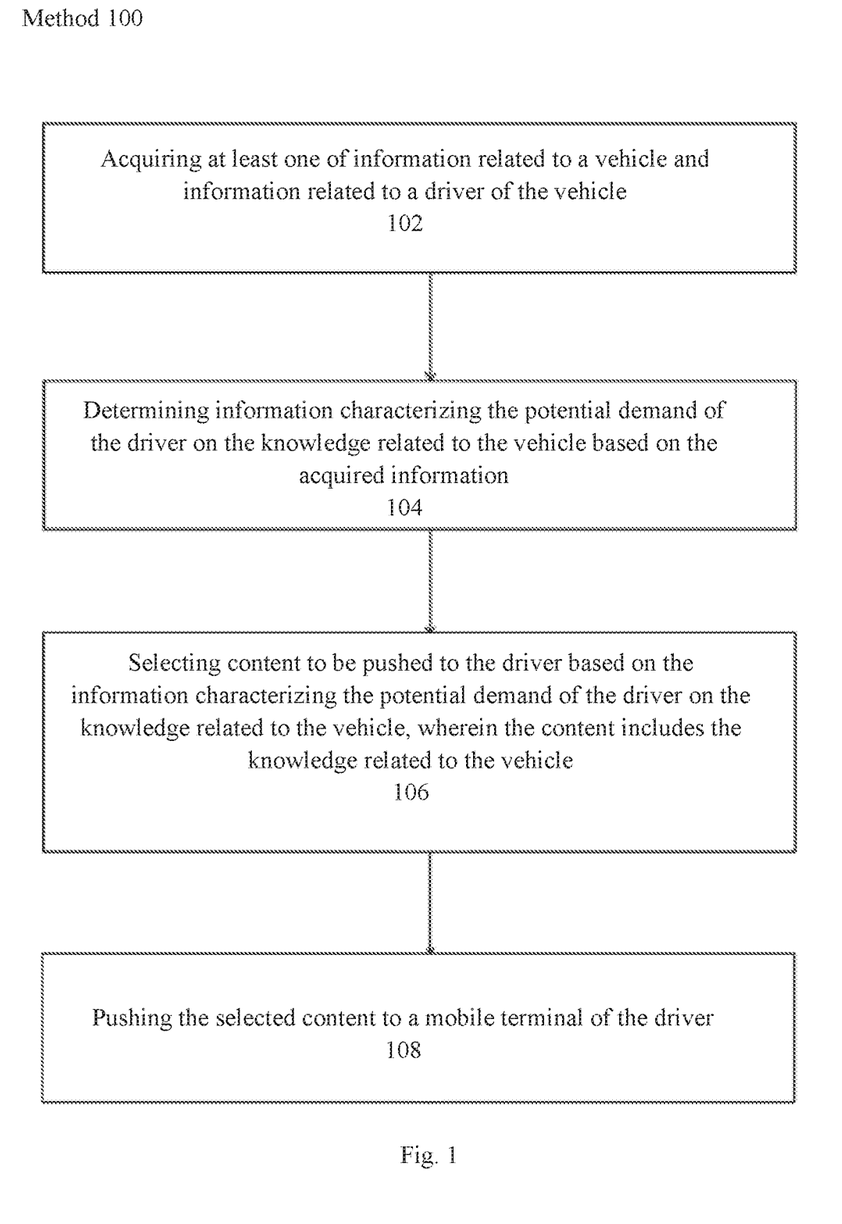
FIG. 1 is a flow diagram of a method for pushing content to a driver according to an embodiment of the present disclosure.

Refer to FIG. 1, which shows a method 100 for pushing content to a driver according to an embodiment of the present disclosure.

As shown in FIG. 1, the method 100 may include step 102. Step 102 includes: acquiring at least one of information related to a vehicle and information related to a driver of the vehicle.

The vehicle described herein is a motor vehicle, and more specifically, is an automobile.

In some embodiments, the information related to a vehicle may include information related to the condition of the vehicle and information related to the environment of the vehicle. The information related to a vehicle may include any information related to the vehicle itself and any information related to the environment of the vehicle. For example, the information related to the vehicle condition may include but not limited to: vehicle model, vehicle configuration, total mileage, total oil consumption, average oil consumption, service time, part wear condition and repair record. The information related to the environment of the vehicle may include but not limited to: position of the vehicle, navigated position of the vehicle, forecasted weather condition (e.g. heavy fog, heavy snow, strong wind, etc.) of the position of the vehicle and/or the navigated position of the vehicle, and geographic feature (e.g., sand beach, grassland, etc.) of the position of the vehicle and/or the navigated position of the vehicle.

The information related to a driver of the vehicle may include any information related to the driver himself and the behavior of the driver. For example, in some embodiments, the information related to the driver of the vehicle may include but not limited to: usage frequency and intensity of a brake, usage frequency and intensity of an accelerator, violation record, driving speed, driving acceleration, average driving time, driving experience and steering wheel turning data.

Step 104 includes: determining information characterizing the potential demand of the driver on the knowledge related to a vehicle based on the information acquired in step 102. In the present disclosure, the information characterizing the potential demand of the driver on the knowledge related to a vehicle may be any information or data capable of reflecting or expressing the potential demand of the driver on the knowledge related to a vehicle. The information characterizing the potential demand of the driver on the knowledge related to a vehicle may include any type and any granularity of information beneficial to accurately expressing and classifying the potential demand of the driver on the knowledge related to a vehicle. The information characterizing the potential demand of the driver on the knowledge related to a vehicle may be of any data form suitable for characterizing and clustering the potential demand of the driver on the knowledge related to a vehicle, e.g., tag, index, etc.

In some embodiments, step 104 may include: deducing a possible fault of the vehicle based on the information acquired in step 102, thus determining information characterizing the potential demand of the driver on the knowledge about preventing or solving the fault. In some other embodiments, step 104 may include: deducing, based on the information acquired in step 102, the knowledge related to a vehicle that is most concerned by the driver, thus determining information characterizing the potential demand of the driver for learning the most concerned knowledge related to a vehicle.

In some embodiments, the information acquired in step 102, for example, includes vehicle model, and step 104 may include: deducing a possible safety belt system fault of the vehicle based on the vehicle model, e.g., the safety belt cannot automatically retract, or the safety belt indicating lamp does not work, etc., thus determining that the driver has a potential demand on the knowledge about how to prevent or solve the safety belt system fault. In this case, for example, step 104 may further include: determining the information characterizing the potential demand of the driver on the knowledge about how to prevent or solve the safety belt system fault as "safety belt fault".

In some embodiments, the information acquired in step 102, for example, may include total mileage, and step 104 may include: deducing that a certain part of the vehicle easily has a fault based on the total mileage, e.g., if the total mileage reaches 10,000 kilometers, deducing that wear of a brake pad may cause brake failure; if the total mileage reaches 30,000 kilometers, deducing that a vehicle tire may leak air or be burst. In this case, step 104 may include: determining that the driver has a potential demand on the knowledge about how to prevent or solve the part fault. Under such circumstance, for example, step 104 may further include: determining the information characterizing the potential demand of the driver on the knowledge about how to prevent or solve the part fault as "brake pad fault" or "tire fault".

In some embodiments, the information acquired in step 102, for example, may include position of the vehicle or navigated position of the vehicle, e.g., somewhere (e.g., Namtso) of Tibetan Plateau. Step 104 may include: deducing that the vehicle easily has tire burst based on the position, thus determining that the driver has a potential demand on the knowledge about how to prevent or solve a tire burst fault. In this case, for example, step 104 may further include: determining the information characterizing the potential demand of the driver on the knowledge about how to prevent or solve the tire burst fault as "tire burst" or "on-plateau tire burst".

In some embodiments, the information acquired in step 102, for example, may include forecasted weather condition of the position of the vehicle and/or the navigated position of the vehicle, e.g., heavy fog, strong wind, heavy rain, heavy snow, large temperature difference between day and night, etc. Step 104 may include: deducing that the driver wants to know knowledge about driving under the extreme weather condition based on this. In this case, for example, step 104 may further include: determining the information characterizing the potential demand of the driver on the most concerned knowledge related to a vehicle as "driving notice for heavy fog", "driving notice for strong wind", etc.

In some embodiments, the information acquired in step 102, for example, may include geographic feature of the position of the vehicle and/or the navigated position of the vehicle, e.g., sand beach. Step 104 may include: deducing that the driver wants to know knowledge about driving on the sand beach based on this, e.g., how to avoid being trapped on the sand beach. In this case, for example, step 104 may further include: determining the information characterizing the potential demand of the driver on the most concerned knowledge related to a vehicle as "driving notice for sand beach", etc.

In some embodiments, the information acquired in step 102, for example, may include driving experience of the driver, e.g., one month of driving experience. Step 104 may include: deducing knowledge related to a vehicle, which is most concerned by the driver, based on the short driving experience of the driver, e.g., usage of common parts, driving notice, basic vehicle maintenance knowledge, emergency response, etc., thus determining that the driver has a potential demand on the knowledge. In this case, for example, step 104 may further include: determining the information characterizing the potential demand of the driver on the most concerned knowledge related to a vehicle as "driving notice", "basic maintenance", etc.

In some embodiments, the information acquired in step 102, for example, may include usage frequency and intensity of a brake used by the driver, e.g., frequent forceful usage. Step 104, for example, may include: deducing that the brake pad of the vehicle easily has a fault and the driver needs to know knowledge about the brake based on this, thus determining that the driver has a potential demand on the knowledge. In this case, for example, step 104 may further include: determining the information characterizing the potential demand of the driver on the most concerned knowledge related to a vehicle as "braking skill", "brake pad fault", etc.

Described above are merely some exemplary embodiments. Those skilled in the art could clearly understand that the information acquired in step 102 may include one or more of the information related to the vehicle and the information related to the driver of the vehicle as described above, and correspondingly, the information characterizing the potential demand of the driver on the most concerned knowledge related to a vehicle as determined in step 104 may also include or reflect one or more of the information related to the vehicle and the information related to the driver of the vehicle. For example, the information acquired in step 102 may include vehicle model and driving experience (e.g., one month), and the information characterizing the potential demand of the driver on the most concerned knowledge related to a vehicle as determined in step 104 may be "basic maintenance of this model of vehicle". That is, the information characterizing the potential demand of the driver on the most concerned knowledge related to a vehicle as determined in step 104 may have different accuracy and granularity. Those skilled in the art could conceive of various other implementation forms of the information capable of characterizing the potential demand of the driver on the most concerned knowledge related to a vehicle, and these implementation forms all fall into the scope of "the information characterizing the potential demand of the driver on the most concerned knowledge related to a vehicle".

The method 100 may further include step 106: selecting content to be pushed to the driver based on the information characterizing the potential demand of the driver on the knowledge related to a vehicle, wherein the content may include the knowledge related to a vehicle.

In some embodiments, step 106 includes: selecting content to be pushed to the driver by interacting with a database. The database may have stored the information characterizing the potential demand of the driver on the knowledge related to a vehicle (e.g., tag or index) and specific content associated with the information. The content may be text, picture, audio or video, or link to relevant content.

For example, in some embodiments, the information characterizing the potential demand of the driver on the knowledge related to a vehicle may be "brake pad fault", and the specific content associated with the information may be any content related to fault reason, maintenance and change of a brake pad.

For example, in some other embodiments, the information characterizing the potential demand of the driver on the knowledge related to a vehicle may be "on-plateau tire burst", and the specific content associated with the information may be any content about preventing on-plateau tire burst and dealing with the emergency.

For example, in some other embodiments, the information characterizing the potential demand of the driver on the knowledge related to a vehicle may be "driving notice for heavy fog", and the specific content associated with the information may be content about how to carefully drive in heavy fog.

For example, in some other embodiments, the information characterizing the potential demand of the driver on the knowledge related to a vehicle may be "braking skill", and the specific content associated with the information may be content about how to correctly brake.

The method 100 may further include step 108: pushing the content selected in step 106 to a mobile terminal of the driver. The mobile terminal of the driver may include but not limited to a on board or portable mobile terminal. The on board mobile terminal, for example, may support the functions of on board GPS positioning and navigation, real-time vehicle condition information collection, short range/remote communication, multimedia interaction, etc. The portable mobile terminal, for example, may support the functions of mobile positioning and navigation, real-time vehicle condition information collection, short range/remote communication, multimedia interaction, etc. The driver can interact with his mobile terminal to receive the pushed content. Optionally, the driver can interact with his mobile terminal to provide a feedback for the pushed content.

In some embodiments, step 108 may include: pushing the content selected in step 106 to the mobile terminal of the driver based on an event. For example, when the driver navigates (e.g., navigates to Namtso), step 108 may include: pushing the content selected in step 106 to the mobile terminal of the driver based on the navigation event, e.g., any content about preventing on-plateau tire burst and dealing with the emergency.

In some embodiments, step 108 may include: pushing the content selected in step 106 to the mobile terminal of the driver based on timing. For example, the pushing can be performed periodically at certain time intervals, e.g., by hour, by day, by week, by month, etc. For example, the content selected for the driver having short driving experience may be a group of content, and step 108 may include: pushing a part of the group of content to the mobile terminal of the driver every day.

In some embodiments, the content pushing method of the present disclosure can actively push the content related to the vehicle according to the characteristics of the vehicle itself and/or the characteristics of the driver of the vehicle, wherein the pushed content is more specific and can assist the driver in better learning the knowledge related to a vehicle. In some embodiments, the content pushing method of the present disclosure can forecast the possible fault based on the characteristics of the vehicle itself and/or the characteristics of the driver of the vehicle, and then actively push the knowledge about how to prevent and/or deal with the fault to the driver, so that the driver can prepare in advance to avoid the fault or traffic accident, or know how to deal when the fault or traffic accident happens. In some embodiments, the content pushing method of the present disclosure can deduce the knowledge most concerned by the driver and related to the vehicle based on the characteristics of the vehicle itself and/or the characteristics of the driver of the vehicle, and then push the content including the knowledge to driver, thereby assisting the driver in learning the knowledge related to a vehicle.

Figure 2:
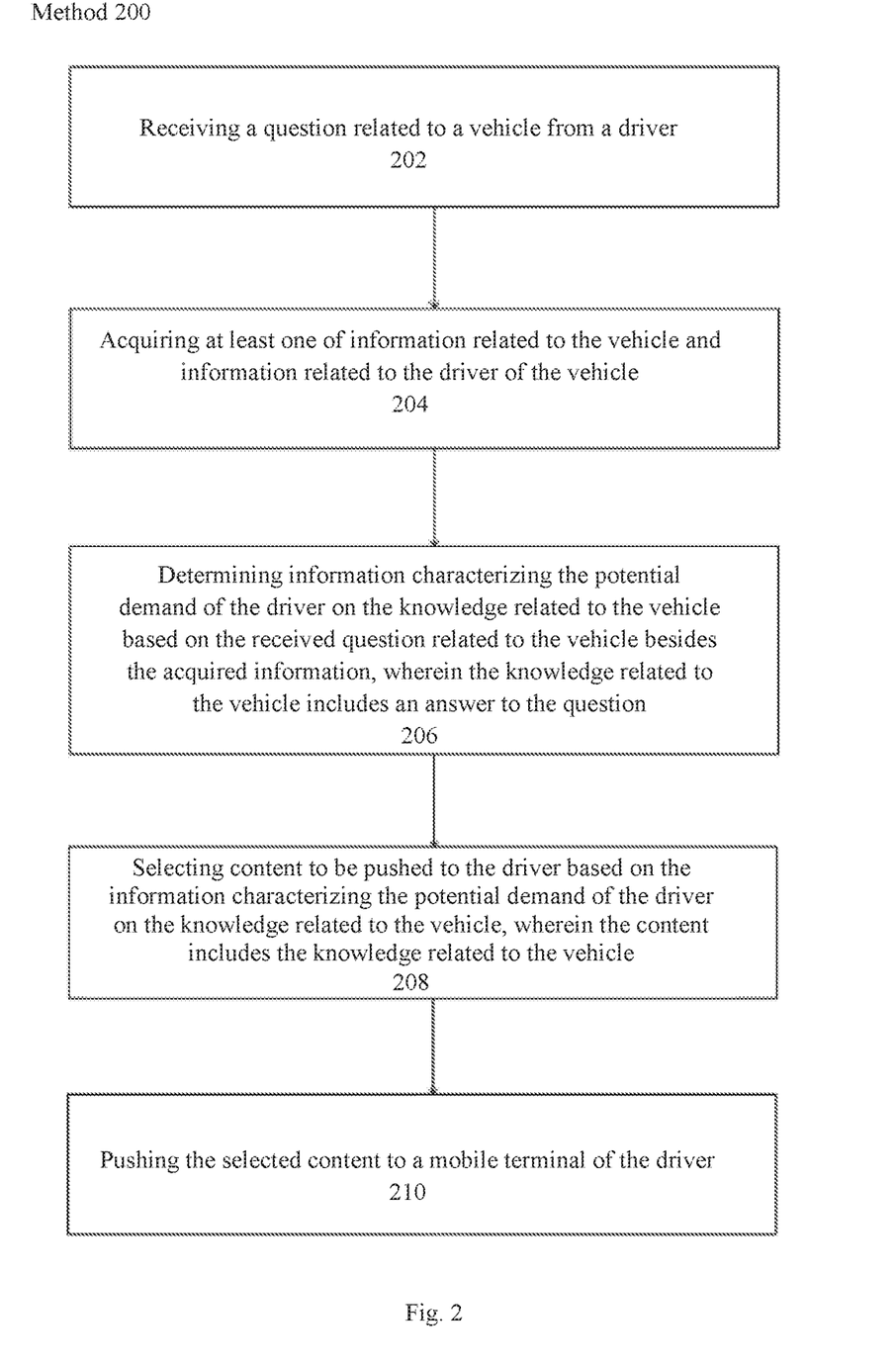
FIG. 2 is a flow diagram of a method for pushing content to a driver according to an embodiment of the present disclosure.

FIG. 2 shows a method 200 for pushing content to a driver according to an embodiment of the present disclosure.

Step 202 includes: receiving a question related to a vehicle from a driver. For example, the question related to the vehicle, received from the driver, may be "what should be noticed during driving in the Tibetan Plateau?"

Step 204 includes: acquiring at least one of information related to the vehicle and information related to the driver of the vehicle. For example, vehicle model of the driver can be acquired.

Step 206 includes: determining information characterizing the potential demand of the driver on the knowledge related to a vehicle based on the received question related to the vehicle besides the acquired information, wherein the knowledge related to a vehicle includes an answer to the question. For example, information characterizing the potential demand of the driver on the knowledge related to a vehicle may be determined based on the question "what should be noticed during driving in the Tibetan Plateau?" and the acquired vehicle model, e.g., "on-plateau driving notice for this model of vehicle".

Step 208 includes: selecting content to be pushed to the driver based on the information characterizing the potential demand of the driver on the knowledge related to a vehicle, wherein the content includes the knowledge related to a vehicle.

For example, corresponding content may be selected based on the "on-plateau driving notice for this model of vehicle", and the content includes an answer to "what should be noticed during driving in the Tibetan Plateau?" for this model of vehicle.

Step 210 includes: pushing the selected content to a mobile terminal of the driver.

The method for pushing content to a driver in the present disclosure can push a more accurate question answer to the driver in consideration with the information related to the vehicle and/or the information related to the driver of the vehicle.

Figure 3:
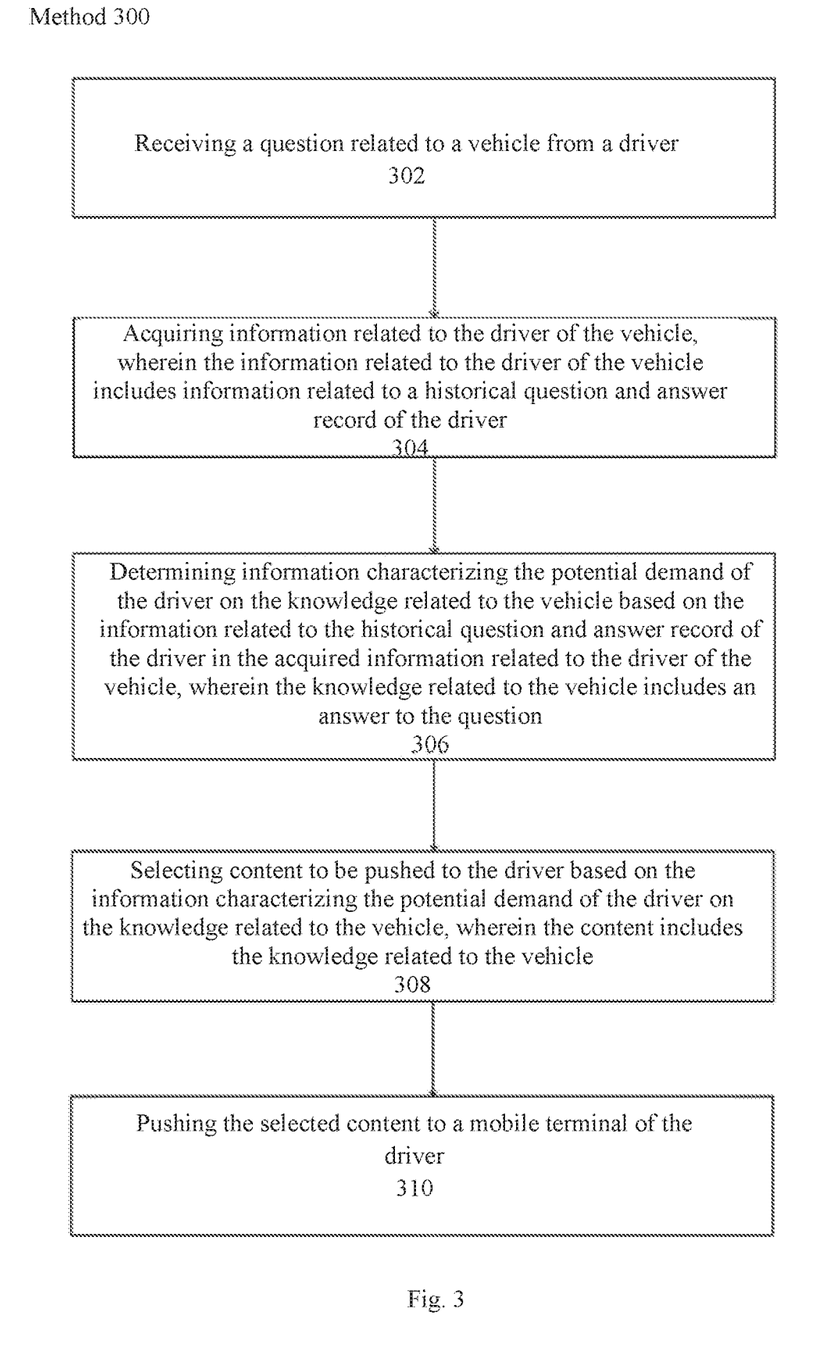
FIG. 3 is a flow diagram of a method for pushing content to a driver according to an embodiment of the present disclosure.

FIG. 3 shows a method 300 for pushing content to a driver according to an embodiment of the present disclosure.

Step 302 includes: receiving a question related to a vehicle from a driver. For example, the question related to the vehicle, received from the driver, may be "what should be noticed during driving in heavy fog".

Step 304 includes: acquiring information related to the driver of the vehicle, wherein the information related to the driver of the vehicle includes information related to a historical question and answer record of the driver. For example, a historical question and answer record of the driver can be acquired, wherein the historical question and answer record of the driver can be regarded as a part of the information related to the driver of the vehicle, and displays the same or similar question asked by the driver before.

Step 306 includes: based on the information related to the historical question and answer record of the driver in the acquired information related to the driver of the vehicle, determining information characterizing the potential demand of the driver on the knowledge related to a vehicle, wherein the knowledge related to a vehicle includes an answer to the question. For example, the information characterizing the potential demand of the driver on the knowledge related to a vehicle, determined based on the historical question and answer record of the driver, may be "driving notice for heavy fog for this model of vehicle" (e.g., this is determined before based on the information related to the vehicle and the previous same or similar question via the method 200).

Step 308 includes: selecting content to be pushed to the driver based on the information characterizing the potential demand of the driver on the knowledge related to a vehicle, wherein the content includes the knowledge related to a vehicle. For example, content to be pushed to the driver is selected based on "driving notice for heavy fog for this model of vehicle", and the content includes an answer to "what should be noticed during driving in heavy fog" for the vehicle of the driver.

Step 310 includes: pushing the selected content to a mobile terminal of the driver.

Optionally, the content to be pushed to the driver may also be directly selected based on the historical question and answer record of the driver.

The method for pushing content to a driver in the present disclosure can push an accurate question answer to the driver more efficiently in consideration with the historical question and answer record of the driver.

Figure 4:
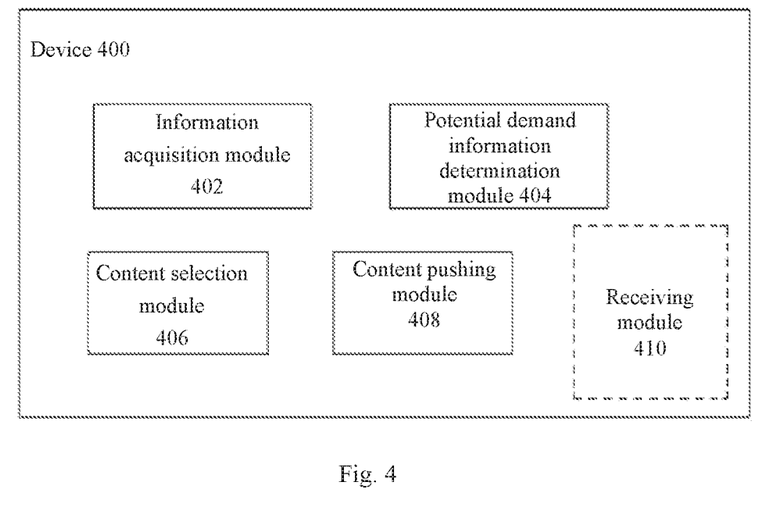
FIG. 4 is a simplified block diagram of a device for pushing content to a driver according to an embodiment of the present disclosure.

Refer to FIG. 4, which shows a device 400 for pushing content to a driver according to an embodiment of the present disclosure. The device 400 may include but not limited to a remote server/system hosting a server application, a web server or a remote server/system hosting remote storage, and may communicate with a remote on board or portable mobile terminal. The device may be implemented by one or more computers. The device may include a database or communicate with an external database. The device may be implemented in a centralized or distributed manner.

As shown in FIG. 4, the device 400 may include an information acquisition module 402, which is configured to acquire at least one of information related to a vehicle and information related to a driver of the vehicle. The information acquisition module 402 may execute steps 102, 204 and 304 in the aforesaid methods 100, 200 and 300.

The device 400 may further include a potential demand information determination module 404, which is configured to determine information characterizing the potential demand of the driver on the knowledge related to a vehicle based on the information acquired by the information acquisition module 102. The potential demand information determination module 404 may execute steps 104, 206 and 306 in the aforesaid methods 100, 200 and 300.

The device 400 may further include a content selection module 406, which is configured to select content to be pushed to the driver based on the information characterizing the potential demand of the driver on the knowledge related to a vehicle, wherein the content may include the knowledge related to a vehicle. The content selection module 406 may execute steps 106, 208 and 308 in the aforesaid methods 100, 200 and 300.

The device 400 may further include a content pushing module 408, which is configured to push the content selected by the content selection module 406 to a mobile terminal (e.g., on board or portable mobile terminal) of the driver. The content pushing module 408 may execute steps 108, 210 and 310 in the aforesaid methods 100, 200 and 300.

In some embodiments, the device 400 may further include a receiving module 410. The receiving module 110 may receive a question related to the vehicle from the driver. The receiving module 410 may execute steps 202 and 302 in the methods 200 and 300. In some embodiments, the receiving module 410 may also receive a feedback provided by the driver via the mobile terminal of the driver for the pushed content, e.g., read, like, comment, etc.

Figure 5:
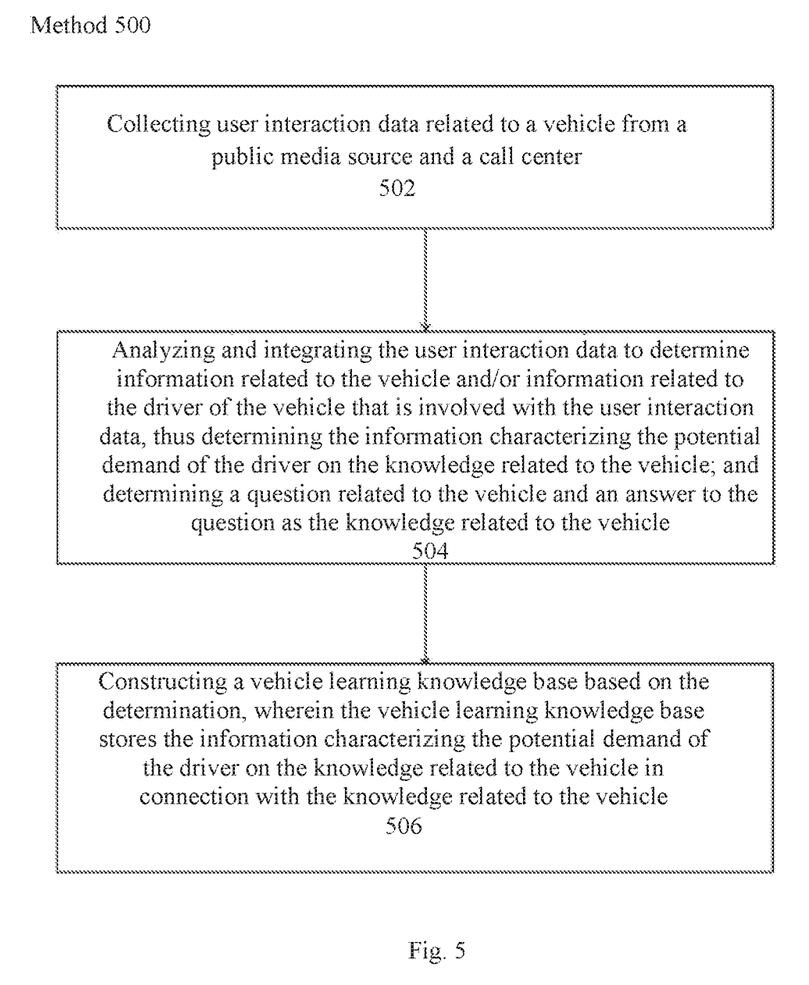
FIG. 5 is a flow diagram of a method for constructing a vehicle learning knowledge base according to an embodiment of the present disclosure.

Refer to FIG. 5, which shows a method 500 for constructing a vehicle learning knowledge base according to an embodiment of the present disclosure.

As shown in FIG. 5, the method 500 may include step 502: collecting user interaction data related to the vehicle from a public media source and a call center. The public media source may include but not limited to automobile websites (e.g., Autohome, auto Sina, etc.), automobile forums (e.g., XCAR forum, etc.), dealer websites, vehicle maintenance websites, vehicle maintenance forums, automobile public contents, etc. The call center may include but not limited to various call centers related to vehicles, such as a voice call center. The user interaction data may include any information or data released on the public media source and related to the vehicle, including but not limited to web pages, questions and answers, comments, read number, like number, forwarding number, etc. The user interaction data may include such question and answer data as texts, pictures, voice, video and the like collected from the call center.

The method 500 may further include step 504: analyzing and integrating the user interaction data to determine information related to the vehicle and/or information related to the driver of the vehicle that is involved with the user interaction data, thus determining the information characterizing the potential demand of the driver on the knowledge related to a vehicle; and determining a question related to the vehicle and an answer to the question as the knowledge related to a vehicle. In some embodiments, analyzing and integrating the user interaction data may include cleaning the user interaction data, thus removing irrelevant data to obtain useful data.

The method 500 may further include step 506: constructing the vehicle learning knowledge base by storing the information characterizing the potential demand of the driver on the knowledge related to a vehicle as determined in step 504 in connection with the knowledge related to a vehicle.

In some embodiments, the information related to the vehicle that is involved with the user interaction data may include but not limited to any information involved with the user interaction data below: (1) vehicle model, vehicle configuration, total mileage, total oil consumption, average oil consumption, service time, part wear condition and repair record; and (2) position of the vehicle, navigated position of the vehicle, forecasted weather condition of the position of the vehicle and/or the navigated position of the vehicle, and geographic feature of the position of the vehicle and/or the navigated position of the vehicle. The information related to the driver of the vehicle that is involved with the user interaction data may include but not limited to any information involved with the user interaction data below: usage frequency and intensity of a brake, usage frequency and intensity of an accelerator, violation record, driving speed, driving acceleration, average driving time, driving experience and steering wheel turning data.

As mentioned above, step 504 may include: determining the information characterizing the potential demand of the driver on the knowledge related to a vehicle by determining information related to the vehicle and/or information related to the driver of the vehicle. In some embodiments, step 504, for example, may include: determining a total mileage (e.g., 10,000 kilometers) and a brake pad fault, involved with the user interaction data, of the vehicle, thus determining the information (e.g., a tag or an index) characterizing the potential demand of the driver on the knowledge related to a vehicle as "brake pad fault". Thus, step 506 may include: connectedly storing the "brake pad fault" in connection with the knowledge related to the vehicle obtained from the user interaction data, e.g., knowledge about how to deal with the brake pad fault. For example, in some other embodiments, step 504 may include: determining heavy fog and driving skills for heavy fog involved with the user interaction data, thus determining the information (e.g., a tag or an index) characterizing the potential demand of the driver on the knowledge related to a vehicle as "driving notice for heavy fog". Thus, step 506 may include: storing the "driving notice for heavy fog" in connection with the knowledge obtained from the user interaction data and related to the vehicle, e.g., knowledge about how to drive the vehicle in heavy fog.

In some embodiments, step 506 may include: determining the raising number of a question related to the vehicle, thus accordingly endowing different questions related to the vehicle with different weights or ranks according to the raising number. Step 506 may further include: determining the affirmation number (e.g., read number, like number or forwarding number, etc.) of an answer to the question, thus accordingly endowing different answers to the questions with different weights or ranks according to the affirmation number. For example, the question raised more times and related to the vehicle is endowed with a higher rank, otherwise, the question raised less times and related to the vehicle is endowed with a lower rank. For example, the question answer read or liked more times is endowed with a higher weight, otherwise, the question answer read or liked less times is endowed with a lower weight.

In some embodiments, the knowledge related to a vehicle may be content in various forms, including character, picture, audio, video and link.

The method for constructing a vehicle learning knowledge base in the present disclosure not only collects data of the call center but also collects data of a large number of public media sources, so that the finally constructed vehicle learning knowledge base can sufficiently meet the real requirement of the driver for the knowledge related to a vehicle, e.g., can recognize a question really concerned by the driver, a fault which occurs relatively easily to the vehicle, a question raised most frequently, a better answer to the question, etc. The method for constructing a vehicle learning knowledge base in the present disclosure not only recognizes the question and the answer related to the vehicle, but also extracts the information related to the vehicle and/or the information related to the driver of the vehicle, and stores the both in connection with each other, so that the finally constructed vehicle learning knowledge base can be used for providing specific knowledge related to a vehicle according to the characteristics of the vehicle and/or the characteristics of the driver.

Figure 6:
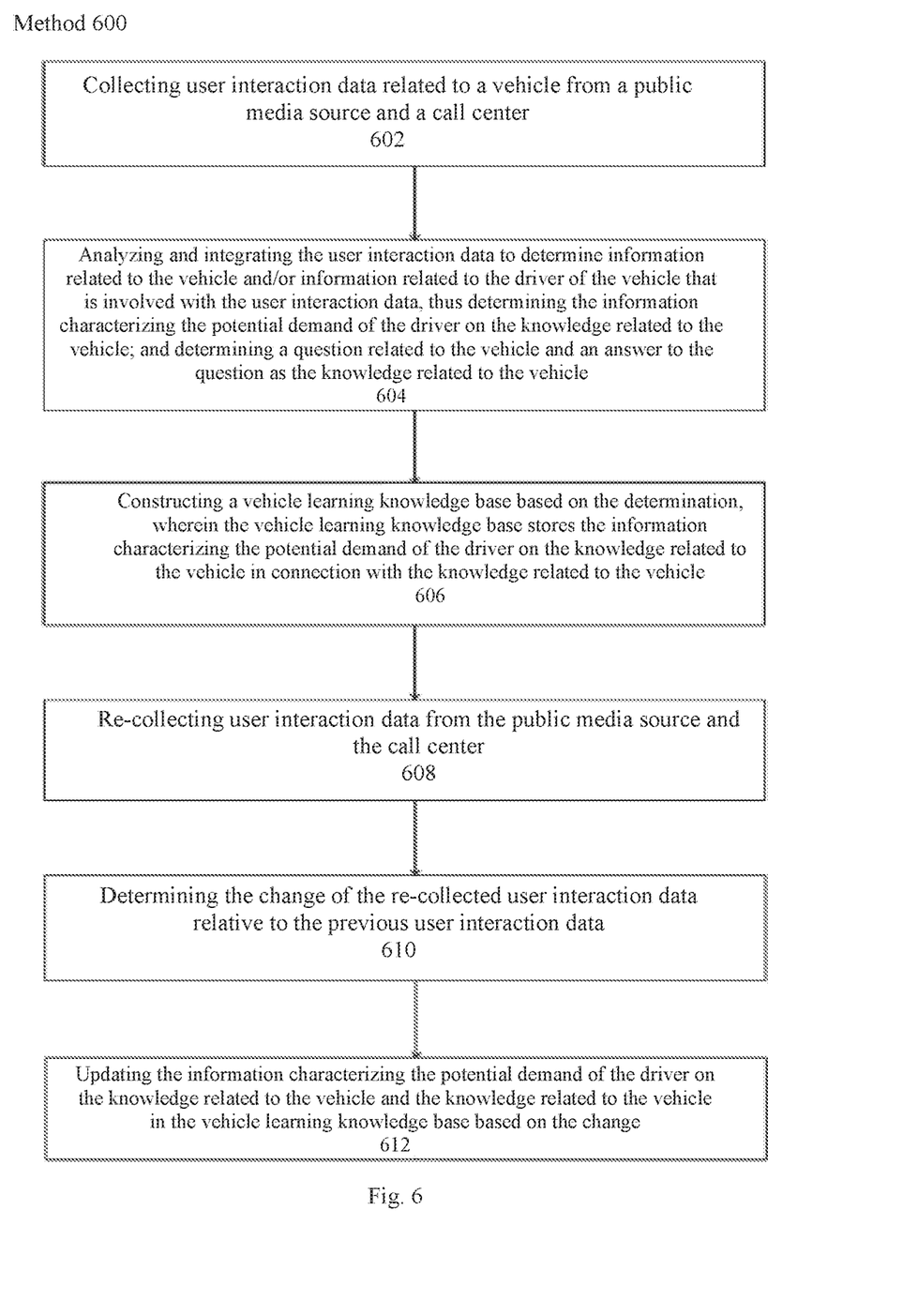
FIG. 6 is a flow diagram of a method for constructing a vehicle learning knowledge base according to an embodiment of the present disclosure.

FIG. 6 shows a method 600 for constructing a vehicle learning knowledge base according to an embodiment of the present disclosure. Steps 602 to 606 are similar to steps 502 to 506 in FIG. 5. Step 608 includes: re-collecting user interaction data from the public media source and the call center. In some embodiments, the user interaction data may be re-collected according to certain time interval (e.g., by month, by quarter, etc.). Step 610 includes: determining the change of the re-collected user interaction data relative to the previous user interaction data. In some embodiments, for example, determined may be a newly raised question related to the vehicle, an answer to the newly raised question, a new answer to the previous question, a change of the read number and/or like number of the answer, etc. Step 712 includes: updating the information characterizing the potential demand of the driver on the knowledge related to a vehicle and the knowledge related to a vehicle in the vehicle learning knowledge base based on the change. For example, a new question and an answer to the question may be added to the vehicle learning knowledge base. For example, the rank of the previous question may be updated. For example, the weight of the previous answer may be updated.

By adopting the method for constructing a vehicle learning knowledge base in the present disclosure, the vehicle learning knowledge base has a self-learning capability, the knowledge stored in the vehicle learning knowledge base can be timely updated to closely fit the change of the real demand of the driver on the knowledge related to a vehicle. The constructed vehicle learning knowledge base can continually update the knowledge related to a vehicle with time, and can be used for providing more accurate and up-to-date knowledge related to a vehicle for the driver.

Figure 7:
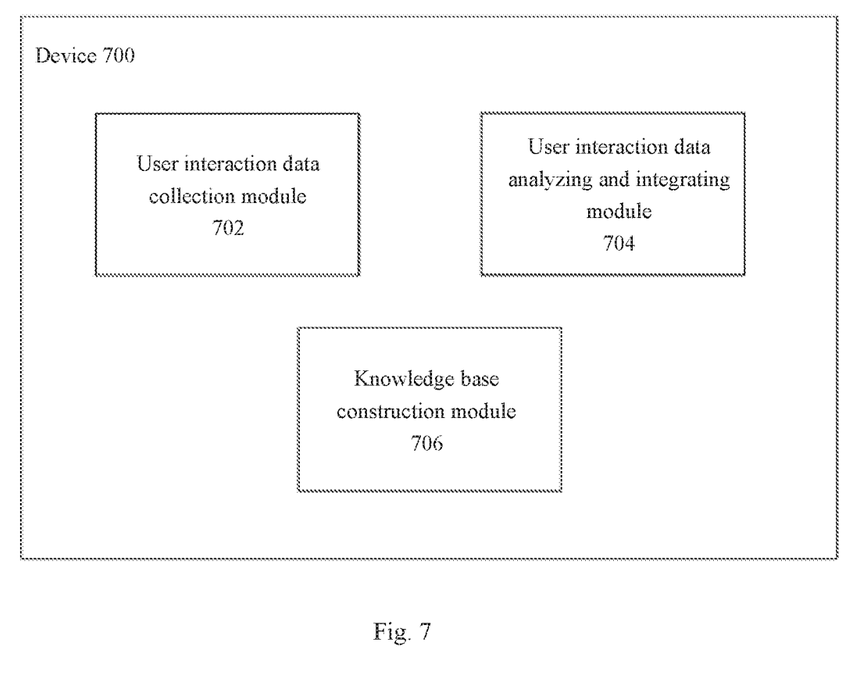
FIG. 7 is a simplified block diagram of a device for constructing a vehicle learning knowledge base according to an embodiment of the present disclosure.

Refer to FIG. 7, which shows a device 700 for constructing a vehicle learning knowledge base according to an embodiment of the present disclosure. The device 700 may include but not limited to a remote server/system hosting a server application, a web server or a remote server/system hosting remote storage, and may or may not communicate with a remote on board or portable mobile terminal. The device may be implemented by one or more computers. The device may include a database or communicate with an external database. The device may be implemented in a centralized or distributed manner. The device 700 and the device 400 may be integrated. The device 700 and the device 400 may be implemented separately. The device 700 and the device 400 may be the same device or different devices.

As shown in FIG. 7, the device 700 may include a user interaction data collection module 702, which is configured to collect user interaction data related to the vehicle from a public media source and a call center. The user interaction data collection module 702 may execute steps 502, 602 and 608 in the methods 500 and 600.

The device 700 may further include a user interaction data analyzing and integrating module 704, which is configured to analyze and integrate the user interaction data to determine information involved with the user interaction data and related to the vehicle and/or information related to the driver of the vehicle, thus determining the information characterizing the potential demand of the driver on the knowledge related to a vehicle; and also configured to determine a question related to the vehicle and an answer to the question as the knowledge related to a vehicle. The user interaction data analyzing and integrating module 704 may execute steps 504, 604 and 610 in the methods 500 and 600.

The device 700 may further include a knowledge base construction module 706, which is configured to construct the vehicle learning knowledge base by storing the information characterizing the potential demand of the driver on the knowledge related to a vehicle as determined by the user interaction data analyzing and integrating module 704 in connection with the knowledge related to a vehicle. The knowledge base construction module 706 may execute steps 506, 606 and 612 in the methods 500 and 600.

Figure 8:
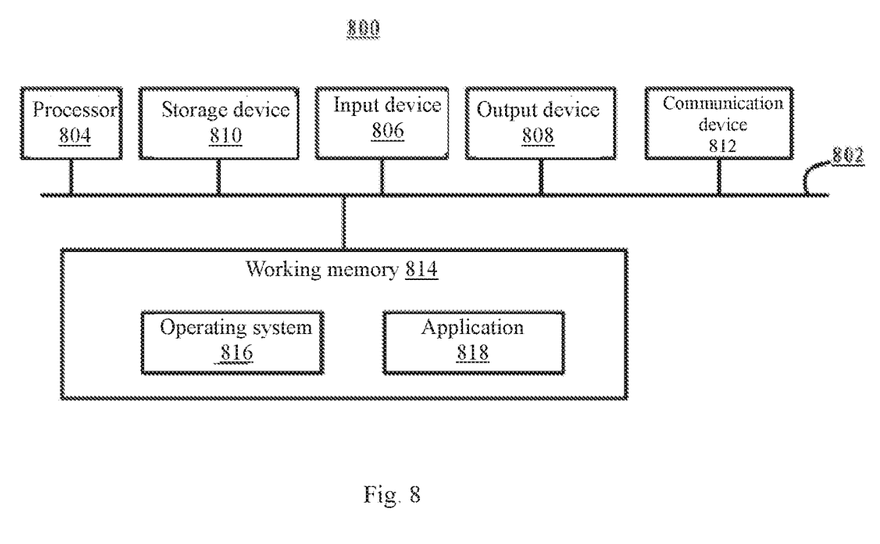
FIG. 8 is a block diagram of a common hardware environment for implementing the device according to an embodiment of the present disclosure.

FIG. 8 shows a common hardware environment 800 capable of implementing the device according to an embodiment of the present disclosure.

Referring to FIG. 8, a computing device 800, as an example of a hardware device to which all aspects of the present disclosure can be applied, will be described. The computing device 800 may be configured as any machine for executing processing and/or computation, and may be but not limited to a workstation, a server, a desk computer, a laptop computer, a tablet computer, a personal digital assistant, a smart phone, a on board computer or a random combination thereof. The aforesaid device 400 and 700 may be integrally or at least partially implemented by the computing device 800 or a similar device or system.

The computing device 800 may include components connected with a bus 802 or communicating with the bus 802, wherein the connection or communication may be implemented by one or more interfaces. For example, the computing device 800 may include the bus 802, one or more processors 804, one or more input devices 806 and one or more output devices 808. The one or more processors 804 may be any type of processor, and may include but not limited to one or more general processors and/or one or more dedicated processors (e.g., dedicated processing chips). The input device 806 may be any type of device capable of inputting information to the computing device, and may include but not limited to a mouse, a keyboard, a touch screen, a microphone and/or a remote controller. The output device 808 may be any type of device capable of presenting information, and may include but not limited to a display, a loudspeaker, a video/audio output terminal, a vibrator and/or a printer. The computing device 800 may further include a non-transient storage device 810 or is connected with the non-transient storage device 810, wherein the non-transient storage device 810 may be any storage device which is non-transient and can realize data storage, and may include but not limited to a disk driver, an optical storage device, a solid state memory, a floppy disk, a flexible disk, a hard disk, a tape or any other magnetic medium, an optical disk or any other optical medium, an ROM (Read-Only Memory), an RAM (Random Access Memory), a cache and/or any other memory chip or cassette and/or any other medium from which a computer can read data, instructions and/or codes. The non-transient storage device 810 may have data/instructions/codes for implementing the above-mentioned methods and steps. The computing device may further include a communication device 812. The communication device 812 may be any type of device capable of communicating with an external device and/or a network, and may include but not limited to a modulator-demodulator, a network card, an infrared communication device, a wireless communication device and/or a chip set, e.g., a Bluetooth™ device, a 1302.11 device, a WiFi device, a WiMax device, a honeycomb communication facility, etc.

The computing device 800 may further include a working memory 814, which may be any type of working memory for storing instructions and/or data for operations of the processors 804, and the working memory 814 may include but not limited to a random access memory and/or a read-only memory.

Software components may be located in the working memory 814, including but not limited to an operating system 816, one or more applications 818, a drive and/or other data and codes. The instructions for executing the methods and the steps described above may be included in the one or more applications 818, and the components/units/modules of the aforesaid devices 400 and 700 may be implemented by reading and calling instructions of the one or more applications 818 by the processor 804. More specifically, the information acquisition module 402 of the device 400, for example, may be implemented by the processor 804 when the application 818 having instructions for executing steps 102, 204 and 304 is executed. The potential demand information determination module 404 of the device 400, for example, may be implemented by the processor 804 when the application 818 having instructions for executing steps 104, 206 and 306 is executed. The content selection module 406 of the device 400, for example, may be implemented by the processor 804 when the application 818 having instructions for executing steps 106, 208 and 308 is executed. The content pushing module 408 of the device 400, for example, may be implemented by the processor 804 when the application 818 having instructions for executing steps 108, 210 and 310 is executed. The receiving module 410 of the device 400, for example, may be implemented by the processor 804 when the application 818 having instructions for executing steps 202 and 302 is executed. The user interaction data collection module 702 of the device 700, for example, may be implemented by the processor 804 when the application 818 having instructions for executing steps 502, 602 and 608 is executed. The user interaction data analyzing and integrating module 704 of the device 700, for example, may be implemented by the processor 804 when the application 818 having instructions for executing steps 504, 604 and 610 is executed. The knowledge base construction module 706 of the device 700, for example, may be implemented by the processor 804 when the application 818 having instructions for executing steps 506, 606 and 612 is executed. Other components of the devices 400 and 700, for example, may be implemented by the processors 804 when the applications 818 having instructions for executing one or more aforesaid corresponding steps are executed. Executable codes or source codes of instructions of software elements may be stored in non-transient computer readable storage media, e.g., the above-mentioned (one or more) storage devices 810, and may be read to the working memory 814 and compiled and/or installed. The executable codes or source codes of instructions of software elements may also be downloaded from remote positions.

The bus 802 may include but not limited to an industry standard architecture (ISA) bus, a micro channel architecture (MCA) bus, an enhanced ISA (EISA) bus, a Video Electronics Standards Association (VESA) local bus and a peripheral component interconnect (PCI) bus.

The computing device 800 may further include a working memory 814, which may be any type of working memory for storing instructions and/or data useful for operations of the processors 804, and may include but not limited to a random access memory and/or a read-only memory.

It could be understood that various changes may be made according to specific demands. For example, customized hardware may also be used, and/or specific components may be implemented by hardware, software, firmware, middleware, micro codes, hardware description languages or any combination thereof. Besides, connection to other computing devices may be adopted, e.g., network input/output devices. For example, some or all of the disclosed methods may be implemented by programming hardware (e.g., a programmable logic circuit including a field programmable gate array (FPGA) and/or a programmable logic array (PLA)) with assembly languages or hardware programming languages (e.g., VERILOG, VHDL, C++) according to the logics and algorithms of the present disclosure.

It could be further understood that components of the computing device 800 may be distributed on a network. For example, some processing may be executed by using one processor, while other processing may be executed by another processor away from this processor. Other components of the computing device 800 may also be distributed similarly. Thus, the computing device 800 may be interpreted as a distributed computing system for executing processing at multiple positions.

It should be noted that the present disclosure further provides a non-transient computer readable medium for storing instructions, and when the instructions are executed by processors, the processors execute the steps of each of the above methods.

The methods and the devices of the present disclosure may be implemented in multiple modes. For example, the methods and the devices of the present disclosure may be implemented by software, hardware, firmware or any combination thereof. The above-mentioned sequences of the method steps are illustrative, and the steps of the methods of the prevention invention are not limited to the sequences described specifically above unless otherwise specified. Besides, in some embodiments, the present disclosure may also be implemented as programs recorded in recording media, and the programs include machine readable instructions for implementing the methods of the present disclosure. Therefore, the present disclosure further covers the recording media storing the programs for implementing the methods of the present disclosure.

Although some specific embodiments have been described in detail by means of examples, it shall be understood by those skilled in the art that the above examples merely intend to illustrate, rather than limiting the scope of the present disclosure. It shall be understood by those skilled in the art that the above embodiments may be modified without departing from the spirit and scope of the present disclosure. The scope of the present disclosure is defined by the appended claims.

What is claimed is:

1. A method, comprising the steps of:
    acquiring at least one of information related to a vehicle and information related to a driver of the vehicle;
    determining information characterizing potential demand of the driver on knowledge related to the vehicle based on the acquired information;
    selecting content to be pushed to the driver based on the information characterizing the potential demand of the driver on the knowledge related to the vehicle, wherein the content comprises the knowledge related to the vehicle; and
    pushing the selected content to a mobile terminal of the driver,
    wherein the step of selecting content to be pushed to the driver based on the information characterizing the potential demand of the driver on the knowledge related to the vehicle further comprises the steps of:
    selecting content to be pushed to the driver from the vehicle learning knowledge base, wherein the vehicle learning knowledge base is constructed by the following operation:
    (i) collecting user interaction data related to the vehicle from a public media source and a call center;
    (ii) analyzing and integrating the user interaction data to determine: information related to the vehicle and/or information related to the driver of the vehicle that is involved with the user interaction data and, thus determining the information characterizing the potential demand of the driver on the knowledge related to the vehicle, and a question related to the vehicle and an answer to the question as the knowledge related to the vehicle; and
    (iii) constructing the vehicle learning knowledge base based on the determination, wherein the vehicle learning knowledge base stores the information characterizing the potential demand of the driver on the knowledge related to the vehicle in connection with the knowledge related to the vehicle, and the method further comprises the steps of:
    re-collecting user interaction data from the public media source and the call center;
    determining change of the re-collected user interaction data relative to the previous user interaction data; and
    updating, based on the change, the information characterizing the potential demand of the driver on the knowledge related to the vehicle and the knowledge related to the vehicle.

2. The method of claim 1, wherein the step of determining information characterizing the potential demand of the driver on the knowledge related to the vehicle based on the acquired information comprises at least one of the following:
    (1) deducing a possible fault of the vehicle based on the acquired information, thus determining information characterizing the potential demand of the driver on the knowledge about preventing or solving the fault; and
    (2) deducing, based on the acquired information, the knowledge related to the vehicle that is most concerned by the driver, thus determining information characterizing the potential demand of the driver for learning the most concerned knowledge related to the vehicle.

3. The method of claim 1, wherein the information related to the vehicle comprises information related to the condition of the vehicle and information related to the environment of the vehicle.

4. The method of claim 3, wherein the information related to the condition of the vehicle comprises at least one of the following: vehicle model, vehicle configuration, total mileage, total oil consumption, average oil consumption, service time, part wear condition and repair record.

5. The method of claim 3, wherein the information related to the environment of the vehicle comprises at least one of the following: position of the vehicle, navigated position of the vehicle, forecasted weather condition of the position of the vehicle and/or the navigated position of the vehicle, and geographic feature of the position of the vehicle and/or the navigated position of the vehicle.

6. The method of claim 1, wherein the information related to the driver of the vehicle comprises at least one of the following: usage frequency and intensity of a brake, usage frequency and intensity of an accelerator, violation record, driving speed, driving acceleration, average driving time, driving experience and steering wheel turning data.

7. The method of claim 1, wherein the content comprises at least one of the following: text, picture, audio, video and link.

8. The method of claim 1, wherein the pushing is based on an event or based on timing.

9. The method of claim 1, further comprising the steps of:
receiving a question related to the vehicle from the driver; and
determining information characterizing the potential demand of the driver on the knowledge related to the vehicle based on the received question related to the vehicle besides the acquired information, wherein the knowledge related to the vehicle comprises an answer to the question.

10. The method of claim 1, wherein the information related to the driver of the vehicle comprises information related to a historical question and answer record of the driver, and the method further comprises the steps of:
receiving a question related to the vehicle from the driver; and
determining information characterizing the potential demand of the driver on the knowledge related to the vehicle based on the information related to the historical question and answer record of the driver in the acquired information related to the driver of the vehicle, wherein the knowledge related to the vehicle comprises an answer to the question.

11. The method of claim 1, wherein the information related to the driver of the vehicle comprises information related to a historical question and answer record of the driver, and the method further comprises the steps of:
receiving a question related to the vehicle from the driver; and
selecting content to be pushed to the driver based on the information related to the historical question and answer record of the driver in the acquired information related to the driver of the vehicle, wherein the content comprises knowledge related to the vehicle, and the knowledge related to the vehicle comprises an answer to the question.

12. The method of claim 1, wherein the vehicle learning knowledge base is further constructed by the following operation:
determining and storing a raising number of a question related to the vehicle and/or an affirmation number of an answer to the question, wherein different questions related to the vehicle are endowed with different weights or ranks according to the raising number, and different answers to the questions are endowed with different weights or ranks according to the affirmation number;
the method further comprises the step of:
selecting content to be pushed to the driver based on the weight or rank of the question related to the vehicle and/or the weight or rank of the answer to the question.

13. The method of claim 1, further comprising the step of:
receiving a feedback provided by the driver via the mobile terminal of the driver for the pushed content.

14. A device, comprising: a memory, used for storing computer readable instructions; and one or more processors, configured to run the computer readable instructions to execute the operations of a method comprising the steps of:
acquiring at least one of information related to a vehicle and information related to a driver of the vehicle;
determining information characterizing potential demand of the driver on knowledge related to the vehicle based on the acquired information;
selecting content to be pushed to the driver based on the information characterizing the potential demand of the driver on the knowledge related to the vehicle, wherein the content comprises the knowledge related to the vehicle; and
pushing the selected content to a mobile terminal of the driver,
wherein the step of selecting content to be pushed to the driver based on the information characterizing the potential demand of the driver on the knowledge related to the vehicle further comprises the steps of:
selecting content to be pushed to the driver from the vehicle learning knowledge base, wherein the vehicle learning knowledge base is constructed by the following operation:
(i) collecting user interaction data related to the vehicle from a public media source and a call center;
(ii) analyzing and integrating the user interaction data to determine: information related to the vehicle and/or information related to the driver of the vehicle that is involved with the user interaction data and, thus determining the information characterizing the potential demand of the driver on the knowledge related to the vehicle, and a question related to the vehicle and an answer to the question as the knowledge related to the vehicle; and
(iii) constructing the vehicle learning knowledge base based on the determination, wherein the vehicle learning knowledge base stores the information characterizing the potential demand of the driver on the knowledge related to the vehicle in connection with the knowledge related to the vehicle, and the method further comprises the steps of:
re-collecting user interaction data from the public media source and the call center;
determining change of the re-collected user interaction data relative to the previous user interaction data; and
updating, based on the change, the information characterizing the potential demand of the driver on the knowledge related to the vehicle and the knowledge related to the vehicle.

15. A non-transient computer readable storage medium, storing computer readable instructions, wherein when the instructions are executed by one or more processors, the processors execute the operations of a method comprising the steps of:
acquiring at least one of information related to a vehicle and information related to a driver of the vehicle;
determining information characterizing potential demand of the driver on knowledge related to the vehicle based on the acquired information;
selecting content to be pushed to the driver based on the information characterizing the potential demand of the driver on the knowledge related to the vehicle, wherein the content comprises the knowledge related to the vehicle; and
pushing the selected content to a mobile terminal of the driver,
wherein the step of selecting content to be pushed to the driver based on the information characterizing the potential demand of the driver on the knowledge related to the vehicle further comprises the steps of:

selecting content to be pushed to the driver from the vehicle learning knowledge base, wherein the vehicle learning knowledge base is constructed by the following operation:

(i) collecting user interaction data related to the vehicle from a public media source and a call center;

(ii) analyzing and integrating the user interaction data to determine: information related to the vehicle and/or information related to the driver of the vehicle that is involved with the user interaction data and, thus determining the information characterizing the potential demand of the driver on the knowledge related to the vehicle, and a question related to the vehicle and an answer to the question as the knowledge related to the vehicle; and (iii) constructing the vehicle learning knowledge base based on the determination, wherein the vehicle learning knowledge base stores the information characterizing the potential demand of the driver on the knowledge related to the vehicle in connection with the knowledge related to the vehicle, and the method further comprises the steps of:

re-collecting user interaction data from the public media source and the call center;

determining change of the re-collected user interaction data relative to the previous user interaction data; and updating, based on the change, the information characterizing the potential demand of the driver on the knowledge related to the vehicle and the knowledge related to the vehicle.

\* \* \* \* \*